Feb. 17, 1953 C. B. ORR 2,628,652
PNEUMATIC TIRE AND METHOD OF MAKING SAME
Filed Aug. 26, 1949 4 Sheets-Sheet 1

INVENTOR
Clifford B. Orr
BY Evans + McCoy
ATTORNEYS

Feb. 17, 1953 C. B. ORR 2,628,652
PNEUMATIC TIRE AND METHOD OF MAKING SAME
Filed Aug. 26, 1949 4 Sheets-Sheet 2

INVENTOR
Clifford B. Orr
BY Evans & McCoy
ATTORNEYS

Feb. 17, 1953 C. B. ORR 2,628,652
PNEUMATIC TIRE AND METHOD OF MAKING SAME
Filed Aug. 26, 1949 4 Sheets-Sheet 3
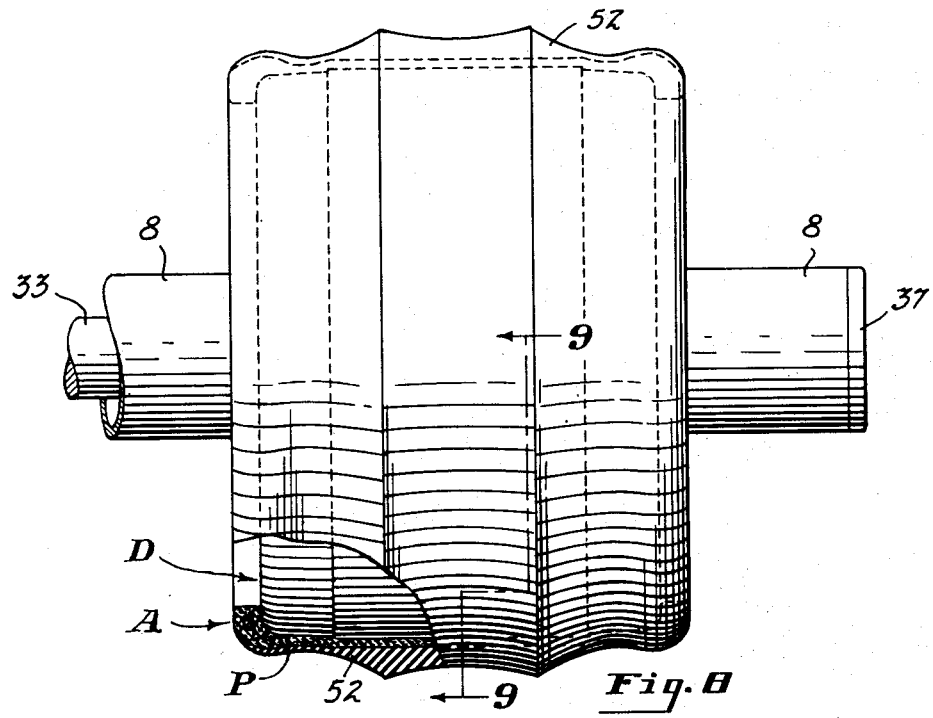
Fig. 8
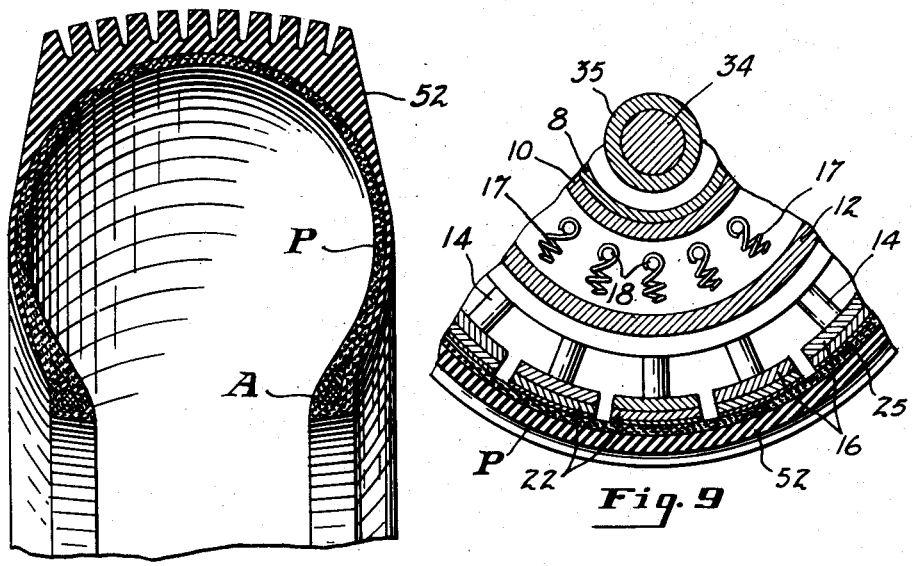
Fig. 10
Fig. 9
INVENTOR
Clifford B. Orr
BY Evans + McCoy
ATTORNEYS INVENTOR
Clifford B. Orr
BY Evans + McCoy
ATTORNEYS Patented Feb. 17, 1953

2,628,652

UNITED STATES PATENT OFFICE 2,628,652

PNEUMATIC TIRE AND METHOD OF MAKING SAME

Clifford B. Orr, Akron, Ohio, assignor to The General Tire and Rubber Company, Akron, Ohio, a corporation of Ohio Application August 26, 1949, Serial No. 112,579

16 Claims. (Cl. 152—354)

This invention relates to the art of building pneumatic tires, more particularly to a building method employing a plurality of layers or plies of bias cut cord material, the ply material being laid up or assembled on a substantially cylindrical drum and subsequently expanded to tire shape. In the manufacture of pneumatic vehicle tires of bias cut cord material it is important that the angularity of the bias cords be retained within design limits in order that the performance and characteristics of the finished tire be in accordance with design objectives.

Cord material customarily employed in the manufacture of pneumatic vehicle tires comprises a multiplicity of parallel cords of cotton, regenerated cellulose, or other natural or synthetic fiber or, in some instances, of twisted wires of steel or other metal, embedded in a sheet of rubber or between sheets of rubber as by calendering. The cords may be held in side by side relation by smaller and more widely spaced cross filaments or threads, such cord material being referred to as "weak weft" fabric, or the material may be "weftless," held by the rubber of the sheet material without the use of cross filaments. A continuous sheet or strip of the rubber embedded cord material is cut on the bias into a series of similar pieces which are spliced end to end to form a continuous ribbon or strip of bias material used in making tires of the type to which the improvements of the present invention are directed.

Although the control of the angularity of the cords in the bias ply material referred to can be satisfactorily controlled, the processing of such cord material into finished tires has heretofore frequently resulted in disturbance of the cord angularity. The cords in one of the resulting tires may be disposed at angles relative to the plane of the tire that vary beyond the intended limits of the design. Not only do the cord angles vary beyond the prescribed limits in different tires, but the cord angles of different plies in the same tire are subject to variation under conventional tire building methods. It is not uncommon to find tires in which different cords of the same ply are disposed at different angles with respect to the median or rotational plane of the tire, such angles being outside the cord angle limits prescribed by the designer.

In the building of tires on automatic and semiautomatic machines using the flat band process, disturbance of the cord angle in some instances is believed to result from tension applied to the bias cut fabric material in drawing the same about the building drum. Building tires by conventional hand methods results in certain cord angle disturbances and variations by reason of the variations in material handling methods and building techniques employed by various operators.

With the above mentioned and other problems in mind, it is one of the principal objects of the present invention to provide an improved tire building process in which the cord angle of the ply material is maintained uniform throughout the entire circumferential extent of the tire and within the limits prescribed by the designer.

Another object of the invention is to provide a generally improved, simplified and more efficient tire building process in which a multiplicity of plies of substantially equal width are assembled together in superimposed relation and are thereafter partially distended in a primary expansion step to provide circular shoulders for receiving annular bead anchorages or assemblies, the circular margins of the plies being then wrapped about the anchorages or bead cores after which chafer and breaker strips, if desired, and tread stock material are applied to the partially expanded band. The radial distension of the band with the applied strips and tread material is thereafter completed in a secondary expansion step and the tire cured in the usual manner. According to a preferred procedure the several plies, comprising any of the customary materials such as mentioned above, are laid up in offset or staggered relation with respect to one another so that the marginal edges of the composite ply band are tapered in section. The subsequent wrapping of the tapered ply band edges about the inextensible circular beads results in a tire structure which presents a tapered cross section of ply material relatively thick adjacent each of the beads and tapered progressively and radially across each side wall of the tire, thus avoiding abrupt thickness changes which are objectionable because of stress concentration resulting therefrom.

Another object of the invention is to provide an improved tire building process that includes a step in which the central portion only of an annular multiple layer ply band is circumferentially expanded to less than its ultimate diameter, the annular marginal portions of the band remaining the original diameter to which the band was formed. Circular inextensible bead wire assemblies are placed against the radially extending shoulder portions of the ply band that connect the expanded central portion to the unexpanded marginal portions of the band, the shoulder portions serving to locate the bead assemblies. Subsequent completion of the radial expansion of the central portion of the annular band to tire shape occurs after the folding of the marginal portions about the bead anchorages, this secondary expanding of the central portion of the tire band also being preferably performed after the application thereto of chafer and breaker strips, if desired, and tread stock material.

A further object is to provide a tire building method in which all of the ply material layers that are to be employed in the finished tire are assembled at one time in sequential operations into a unitary composite band so that the adhesion between the several ply material layers prevents or resists displacement of the cords in the cord material comprising the layers. Control of the cord angles is thus effectively maintained and the relative angular relationships of the cords in the several ply layers persist even though the composite or unitary band may be subjected to considerable handling or manipulation between the time of its formation and the time of its assembly with beads and tread stock and expansion into a tire casing.

The above and other objectives of the invention relating to certain procedures and combinations of process steps will become apparent from the following detailed description. This description is made in connection with the accompanying drawings forming a part of the specification. Like parts throughout the several views are indicated by the same letters and numerals of reference.

Figure 1:
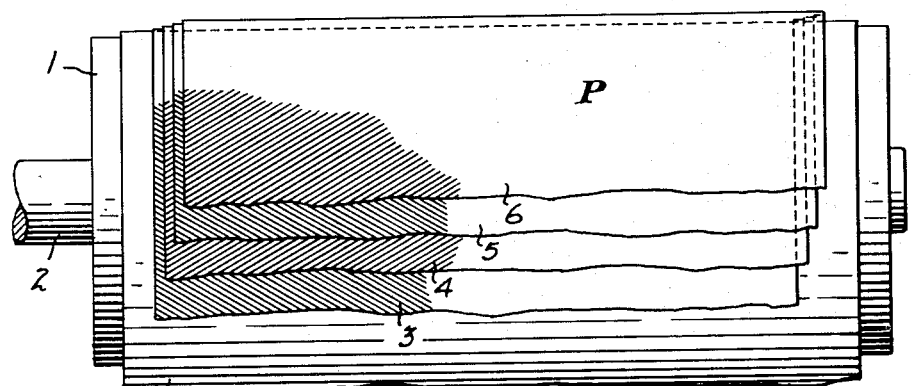
Figure 1 is a diagrammatic representation of a fragmentary portion of a building apparatus for tire ply bands, the apparatus having a plurality of annular layers of bias cut cord material laid up thereon in superimposed relation to form a unitary or composite annular ply band such as contemplated for use in the present process.
Figure 2:
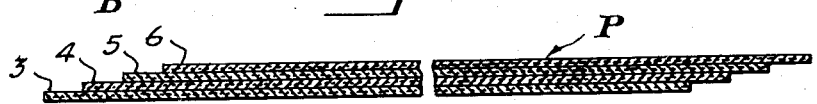
Fig. 2 is a transverse foreshortened sectional detail, diagrammatic in character, through a composite or unit ply band such as that shown in Fig. 1.
Figure 3:
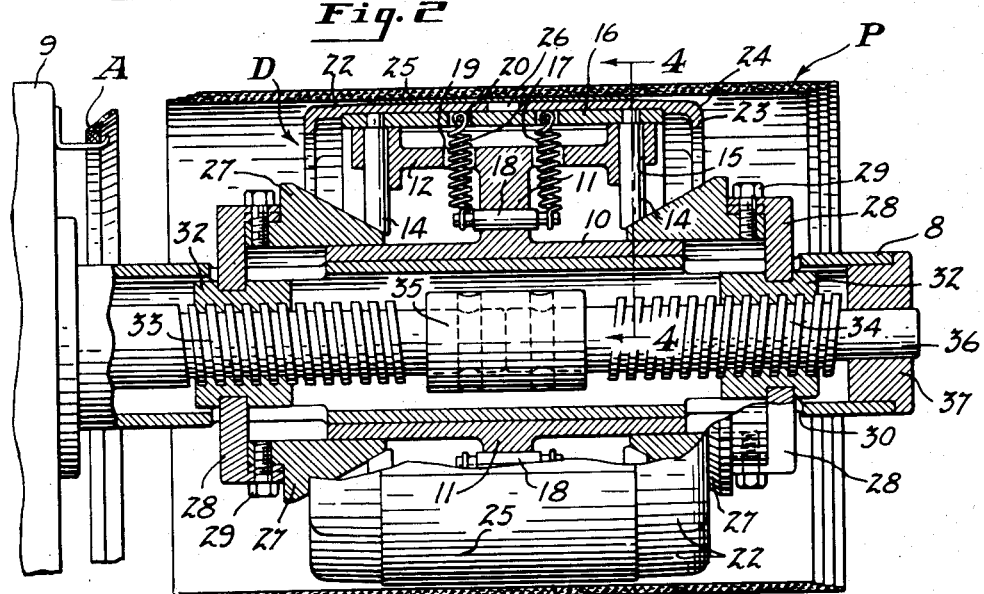
Figure 4:
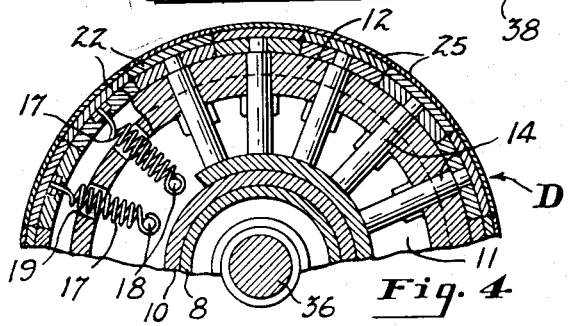
Figure 5:
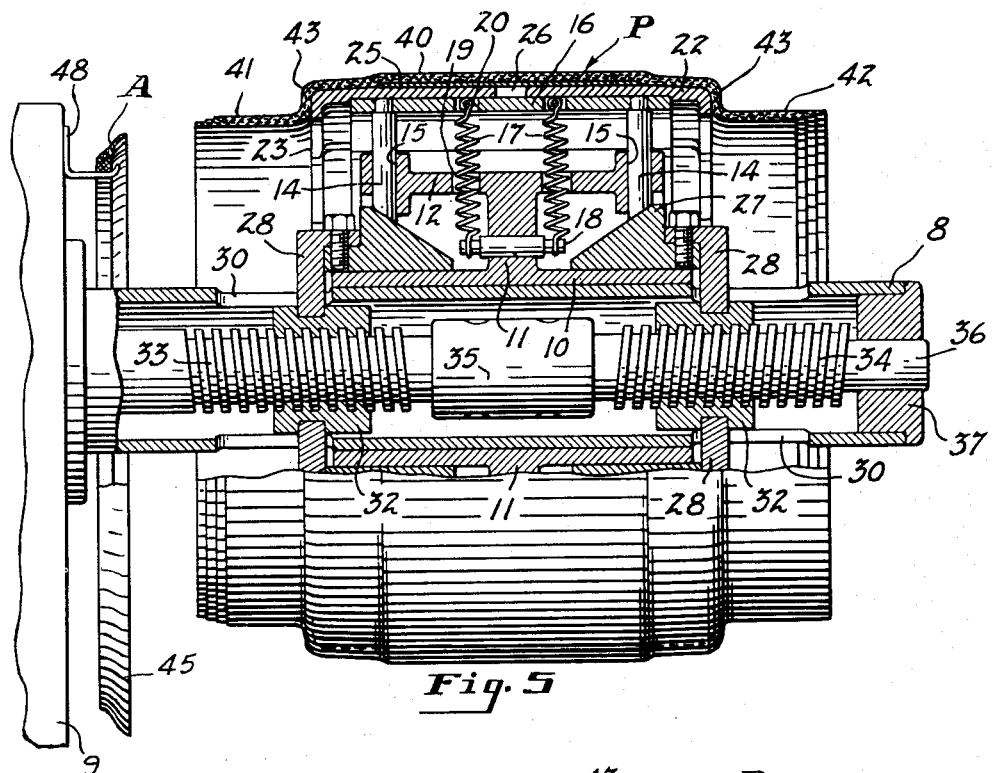
Figure 6:
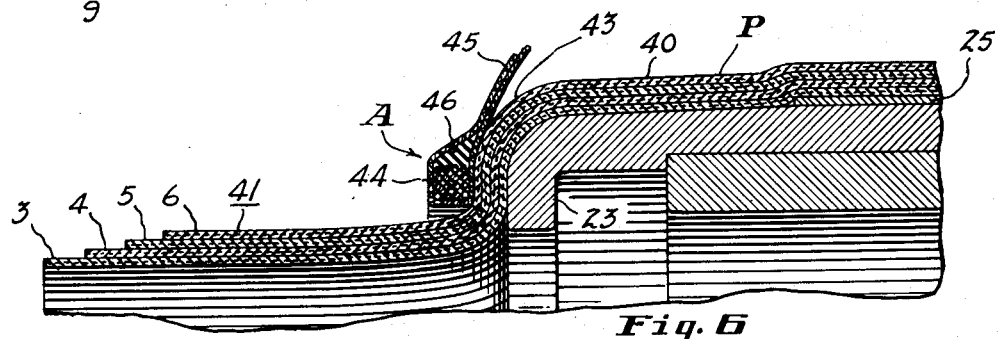
Figure 7:
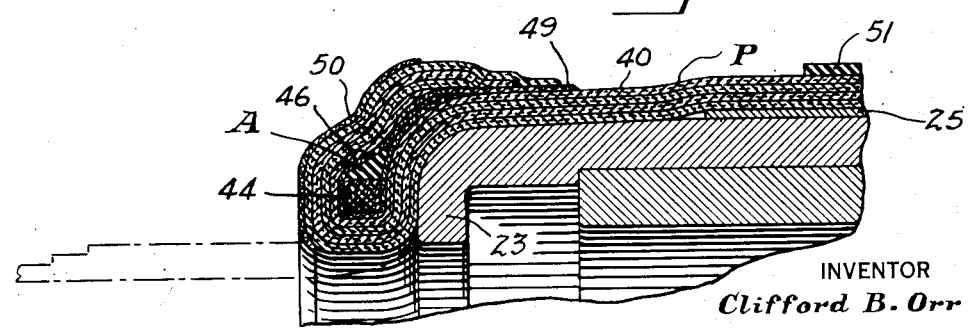
Figure 11:
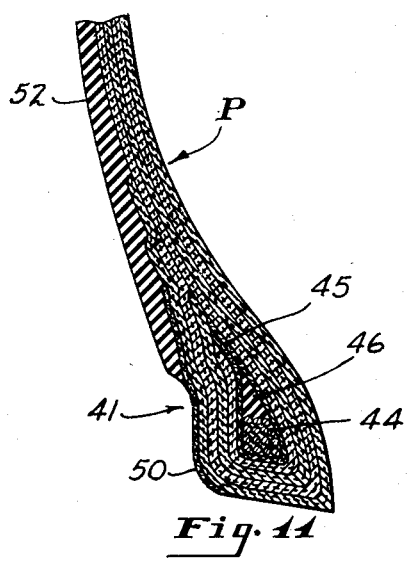
Figure 12:
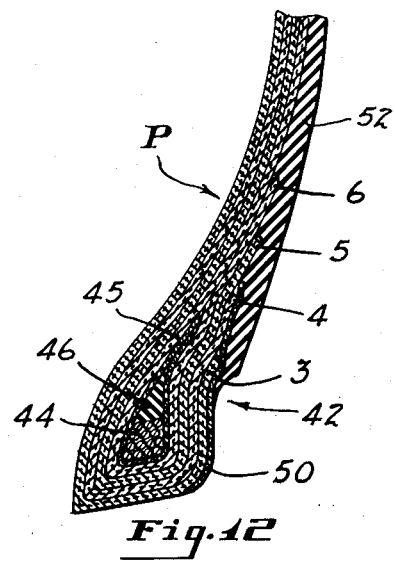
Figure 13:
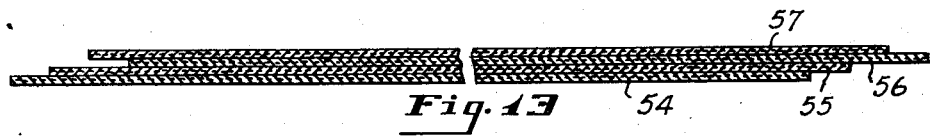
Figure 14:
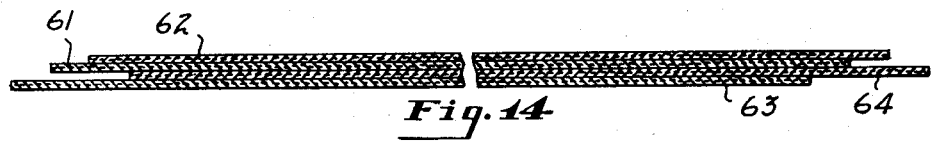
Figure 15:
Figure 16:
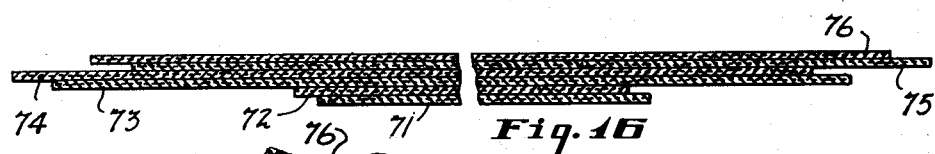
Figure 17:
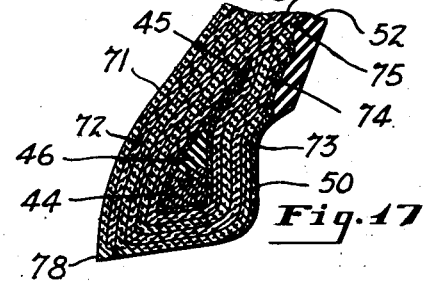

Fig. 3 is a fragmentary side elevational view of an expansible drum apparatus suitable for use in practicing the present invention, the drum being used for assembly of the component parts of the tire and for partial or initial expansion of the unitary ply band, this view being partially in section, with parts broken away and removed to show the band of the preceding figures positioned on the drum preliminary to the partial expansion of such band;

Fig. 4 is a fragmentary transverse sectional detail through the expansible building drum, this view being taken substantially along the line indicated at 4—4 of Fig. 3, parts being broken away and removed, and the ply band being omitted;

Fig. 5 is a side elevational view of the expansible drum apparatus of Figs. 3 and 4 showing the unit ply band of Figs. 1 and 2 mounted thereon and partially expanded, the drum and band being shown partly in section and with parts broken away and removed;

Fig. 6 is a fragmentary sectional detail through one shoulder of the partially expanded drum and band showing one of the circular bead assemblies disposed against the radial shoulder of the band, this view being taken through the upper left hand shoulder of the drum and ply band of Fig. 5 and enlarged with respect to that figure;

Fig. 7 is a sectional detail similar to Fig. 6 showing a stage of the tire building process subsequent to the folding of the marginal portion of the ply band about the bead and the placing of the chafer and breaker strips;

Fig. 8 is a side elevational view, partly in section and with parts broken away and removed, showing the completed partially expanded tire band still mounted on the expansible drum with the tread rubber stock in place, the view corresponding to Figs. 3 and 5 to show a subsequent stage in the process;

Fig. 9 is a fragmentary sectional detail taken transversely through the expanded building drum, this view being taken substantially along the line indicated at 9—9 of Fig. 8;

Fig. 10 is a transverse radial sectional view through a fragment of a completed pneumatic tire made in accordance with the present process;

Figs. 11 and 12 are enlarged transverse sectional details through the bead portions of the tire of Fig. 10;

Figs. 13 through 15 are foreshortened diagrammatic views similar to Fig. 2 each showing an alternative overlapping arrangement of the several plies of a four ply tire;

Fig. 16 is a diagrammatic foreshortened sectional view similar to Fig. 2 showing a modification in which six plies are assembled into a composite band unit for a pneumatic tire; and Fig. 17 is a sectional detail similar to Fig. 12 showing the bead portion of a six ply tire made from the band unit represented in Fig. 16.

In building tires in accordance with the method of the present invention, strips of bias cut cord material such as that previously mentioned or employed in the manufacture of conventional pneumatic vehicle tires are assembled into composite or unitary ply bands having the total requisite number of layers or plies for the desired tire. This method is suitable for use in the manufacture of tires having eight, ten, or more plies but is of particular utility, economy and efficiency in the manufacture of relatively lightweight four or six ply tires such as customarily used for passenger automobiles.

The following description of the process is set forth in connection with the building of a four ply passenger vehicle pneumatic tire, it being understood that similar procedures and process steps with obvious modifications are followed in the making of tires having a greater number of plies.

Ply band unit

All of the plies desired in the completed tire are initially assembled together in a preliminary band building operation to form the unit or composite ply band P. By thus assembling all of the plies into a composite unit ply band, control is obtained over the cord angle of each of the plies and over the different portions of each ply. Since the cords of successive plies are disposed in crossed relation with respect to one another, or are alternate handed in accordance with conventional pneumatic tire design, the adhering together of the inherently tacky rubberized cord material serves as a setting or locking arrangement. Permanent disturbance or alteration of the angle of the cords of the ply material during subsequent storage, transit, and handling of the ply band is substantially eliminated or minimized.

The multiple layer composite ply band P unit is built by hand or on conventional machines by operators who may specialize in such procedure and who by reason of such specialization can become adept, accurate, and efficient in the band building operation. In Fig. 1 is represented a suitable band building apparatus which may correspond to that disclosed in copending application Serial No. 77,882, filed February 23, 1949, now Patent No. 2,588,207. An endless carrier belt or building band B of flexible substantially inextensible fabric material is tensioned about a cylindrical drum 1 and a roller, not shown, spaced from the drum. The drum is mounted to turn on or about a horizontal shaft 2.

There is laid up on the flexible building band B, in sequence, a plurality of superimposed layers or strips of ply material indicated at 3, 4, 5 and 6. The ply layers are placed on the building drum with the bias cords disposed diagonally, the direction of the cords in each layer being opposite to that of the preceding layer. Between the several ply material layers, strips or sheets of raw or partly cured gum rubber stock may be interposed, as desired, for the purpose of imparting any desired body or composition characteristics to the unit ply band. Such gum rubber or "squeegee" stock has been omitted from the drawings for simplicity. The ends of each layer or strip of ply material are overlapped or otherwise spliced to form an annulus so that the several plies together comprise the unitary multiple layer composite annular ply band P. The layers of the band adhere together by reason of the tacky character of the raw or partly cured rubber sheet material in which the cords are embedded.

In laying up the ply material on the building band B each layer of ply material is offset axially with respect to the preceding band so that the annular marginal edges of the ply band P are stepped and tapered in cross section. In making the ply band illustrated in the first twelve figures of the drawings, the successive layers of ply material are axially offset in the same direction and by approximately equal amounts; between about one-quarter inch and about three-quarters of an inch, preferably about one-half inch is a suitable offset. Other arrangements for providing different types of tapered thickness edges on the ply bands may be resorted to as will be later mentioned in connection with Figs. 13 through 16. All of the ply material layers are preferably made from bias cut ply material strips of the same width or approximately so although, of course, the tapered thickness edges on the ply band may be provided, if desired, by using ply material strips of different widths for the various layers in the composite ply band.

After release of the tension in the building band B, the composite ply band P is stripped from the building apparatus and further processed in accordance with the method of the present invention. Distortion or stretching of the assembled ply band such as might occur in the temporary storage, transit, or handling does not result in objectionable relative displacement of the cords or permanent alteration of the relative cord angles for the reason that any distortion to which the band is subjected takes place through the entire thickness of the ply band and tends to be corrected during the subsequent partial expansion and processing.

*Band expansion*

To assemble the ply band with separately formed inextensible annular bead cores, the band is disposed about and distended by an expansible drum D of generally cylindrical shape supported by a tube or quill 8 journaled in a frame structure 9. Suitable means is provided for driving the hollow quill 8 to rotate the drum D. The drum comprises a body member that includes a sleeve or hub 10 received on the hollow quill 8 and centrally formed with an integral radially extending circular disc 11. This disc carries a cylindrical guide member 12 integral with the disc and concentrically disposed with respect to the sleeve 10 and the supporting quill 8. At each end the guide member 12 carries a series of circumferentially spaced radial pins or rods 14 that are guided for axial sliding movement in sockets 15. Support elements 16 each of less length than the drum, are disposed in side by side parallel relation about the guide member 12, the elements each being secured adjacent its ends to the outer ends of a pair of the guide pins 14. The elements 16 are thus mounted for parallel sliding motion toward and away from the rotational axis of the supporting quill 8.

A pair of helical coil springs 17 are tensioned between each of the support elements 16 and the body member of the drum to bias the support elements to retracted positions in which such elements seat against the outer face of the guide portion 12 of the drum body. A suitable construction includes pins 18 retained as by press fits in circumferentially spaced axial bores in the disc 11 and formed with reduced diameter end portions drilled to receive the inner ends of the springs 17. The springs extend through spaced openings 19 in the guide portion 12 of the drum body, the outer ends of the springs being received in spaced recesses or openings 20 of the support elements 16 and secured on pins carried by the support elements and extending across such openings.

Mounted on each of the support elements 16 is a pair of aligned drum segments 22 disposed in end to end relation and formed with angularly disposed flange portions 23. The drum segments are rounded or mitered at their corners as indicated at 24 and are curved transversely so that, collectively, the segments provide a substantially cylindrical drum surface having rounded corners or shoulders at the ends of the drum. In the partial expansion of a ply band, the cord material of the latter is drawn or tensioned over the drum shoulders without objectionable cutting or tearing of the material of the ply band. The segments 22 are individually connected to the support elements 16 as by recessed cap screws, the cap screws desirably being received through elongated slots in the drum segments to permit longitudinal adjustment of the segments in altering the effective length of the drum in building tires of different sizes. Thin metal plates 25 of substantially the same width as the drum segments 22 are secured to the segments as by recessed head screws to bridge gaps 26 between the segment ends.

The inner ends of the pins 14 all bear against the tapered faces of confronting cones 27 axially slidable along the sleeve portion 10 of the drum body member. The cones 27 carry radial gibs 28 secured thereto as by cap screws 29. These gibs extend through and are guided in axial slots 30 formed in the quill 8 to prevent turning of the cone assemblies relative to the quill. Within the quill the inner ends of the gibs 28 are received in radial sockets 31 formed in nuts 32 carried on oppositely threaded portions 33 and 34 of a shaft which extends axially through the quill 8. The portions 33 and 34 of the shaft, separately formed, are secured in rigid axial alignment as by a coupling collar 35. Reduced diameter outer end 36 of the shaft portion 34 is guided for relative rotation in a plug 37 carried by the outer end of the quill 8, the other end of the inner shaft being connected to suitable drive means interiorly of the frame structure 9 so that the threaded shaft can be rotated relative to the quill 8. Such relative rotation operates to shift the cones 27 axially along the shaft toward and away from one another either to force the radial pins outwardly in distending the drum D to a larger diameter or to permit the drum segments to be retracted by the tension springs 17.

To distend the pre-assembled composite ply band P for bead placement, the band is disposed about the drum D as shown in Fig. 3, the drum being retracted to its minimum diameter so that the ply band may be readily received thereover without stretching. It is preferable that the drum be of less external diameter than the normal inside diameter of the annular ply band so that a clearance 38 (Fig. 3) is present between the ply band and the drum in initial assembly.

With the assembled ply band P centered axially on and supported by the drum D the latter is expanded to the predetermined larger diameter position shown in Fig. 5 by rotating the shaft portions 33 and 34 relative to the quill so as to draw the blocks or cones 27 toward one another. The expansion of the drum is uniform, or substantially so in all radial directions and the accompanying distension of the ply band is likewise uniform, taking place simultaneously about the entire circumferential extent of the band while the latter is uniformly supported substantially throughout its circumference and while, across the greater part or central portion 40 of its width, the band is retained in substantially cylindrical form. Thus localized distortion of the ply band and the ply material layers of which it is composed is effectively avoided. Marginal portions 41 and 42 of the ply band which project beyond and are not engaged by the expanding drum are not distended to the predetermined diameter to which the centrally disposed major portion of the band is enlarged, but remain at some lesser diameter or do not appreciably expand. Integral connecting portions of the band, extending between the expanded cylindrical central portion and the annular marginal portions of the band, are tensioned against the curved or rounded shoulders 24 and preferably flatwise against the radial flanges 23 of the expanded drum, providing firm, wrinkle-free annular attachment areas or shoulder zones 43 for receiving the inextensible bead core assemblies or anchorages.

In this extension of the drum and the ply band mounted thereon the drum either may be stationary or may be rotated at a speed sufficient to hold each of the projecting annular end portions of the ply band substantially in cylindrical form and shape by centrifugal force. The expansion of the ply band P on the drum D is only a partial distension, the band being removed from the drum for completion of the expansion in a separate process step after the bead cores have been incorporated.

In its initially expanded condition, illustrated in Figs. 5 and 6, the central portion 40 of the ply band P is circumferentially distended to a predetermined intermediate diameter which is greater than that of the ply band as originally assembled but less than that of the reinforcing ply material body in the fully expanded band and finished tire.

The ply band shoulders are preferably substantially radially disposed and extend between and connect the distended relatively wide central portion 40 of the band and the relatively unstressed, normal diameter circular marginal portions 41 and 42 of the ply band to provide locating abutments for the bead core assemblies. This phase of the present process is of particular importance in that it provides a ply band having a partially expanded central portion which is drawn tightly about the building drum, thereby preventing displacement of the band in the bead placing operation, and also smaller diameter relatively unstressed circular or annular marginal portions which can be folded about conventional inextensible circular beads while the latter are disposed or held against the tensioned radial shoulder portions 43 of the ply band and supported by the underlying rigid flange portions 23 of the expansible drum.

*Bead anchorages*

The bead anchorages or assemblies A, of conventional construction, comprise a multiplicity of strands 44 of high tensile strength steel wire embedded in rubber and wrapped or enveloped in the fold of a reversely turned strip of woven fabric material. The fabric material forms an angularly disposed flipper flange 45 which extends around the entire circumferential extent of the bead. A filler strip 46 of rubber or similar material is disposed between the layers of the bead binder or flipper fabric to provide the desired contour.

After the partial distension of the ply band P the bead assemblies A are placed against the band shoulder portions 43, this operation being performed by hand or by suitable bead placing and setting devices such as those shown in Patents 1,966,541; 2,313,035 and 2,409,974. The fabric binding strips forming the bead flippers or flanges 45 are preferably impregnated or coated with a bonding agent or are of inherently tacky nature so that when placed against the ply band shoulders the bead assemblies strongly adhere thereto. If not adhesive themselves, the bead assemblies are cemented in place. The flipper flanges 45 are "stitched" or kneaded firmly against the curved shoulder portions 43 of the ply band to retain the bead assemblies in predetermined positions on the ply band shoulders, the beads being concentric to the axis of the drum D.

The bead assembly A for the left hand end of the ply band, as viewed in Figs. 3 and 5, is preliminarily passed over the drum D while the latter is contracted and before the ply band P is placed about the latter. While the ply band is being assembled on the drum and distended, the bead assembly can be supported as by being hung on a bracket or hook 48 carried by the frame structure 9. Similarly, if automatic bead placing or bead setting devices are used to place the beads against the shoulders of the expanded ply band, one of the beads is preliminarily passed over the contracted building drum and is located on the appropriate bead setting device prior to the placing of the ply band about the drum.

After the beads are located and secured in place against the locating band shoulders 43 the projecting marginal portions 41 and 42 of the bands are folded about the beads and adhered against the bead flipper flanges 45. This folding is accomplished by hand, using suitable turning tools, or by mechanical means known in the art and arranged to operate either progressively about the drum shoulders or simultaneously about the entire drum circumference. The marginal portions 41 and 42 are of sufficient width or axial extent so that, when folded about the bead assemblies A the tapered thickness edge portions extend over the curved shoulder portions 43 of the ply band, beyond the bead flipper flanges 45, and onto the central expanded cylindrical portion 40 of the band.

In certain types of tires it is desirable to provide additional rubber stock between the body of the ply band and the tapered thickness margins of the folded over ply band. Such stock may be supplied in the form of raw or partially cured gum strips 49 placed on and adhered to those portions of the body of the partially expanded ply band that are subsequently covered by the folded over marginal portions 41 and 42.

Subsequent to the folding of the marginal portions 41 and 42 about the previously located bead assemblies A, chafer strips 50 and a breaker strip 51 may be placed against the ends and central portions, respectively, of the ply band assembly, these parts being shown in Fig. 7.

A strip of tread stock 52 is placed about the partially expanded ply band after the chafer and breaker strips have been applied. The tread stock includes the customary relatively heavy sectioned central portion to form the road engaging tread of the tire and the relatively thin side or marginal portions to form the protective covering for the side walls of the tire.

The placing of the tread stock strip about the ply band completes the assembly of the substantially cylindrical partially expanded tire band unit illustrated in Fig. 8. This band unit is removed from the drum D which is first collapsed by reverse rotation of the threaded shaft portions 33 and 34 relative to the quill, the drum segments 22 being contracted to minimum diameter by the springs 17. The tire band is removed from the collapsed building drum by withdrawing it axially over one end of the latter.

By conventional means the band unit is further expanded, fitted with the usual air bag, and cured in a heated mold in accordance with customary tire making practice. Fig. 10 shows the appearance of the tire, in section, after removal of the same from the curing and vulcanizing mold, the bead portions of the completed tire being shown in greater detail in Figs. 11 and 12.

During curing of the fully expanded tire under heat and pressure, in a mold, the folded over marginal portions 41 and 42 of the ply band are bonded firmly to the bead assemblies and to the body portion of the ply band, thereby securing the cord ends of the several plies securely about the bead assemblies. The wire core of the bead formed against the left hand end of the building drum, as viewed in Figs. 3 and 5 through 8, is embraced by ply material cords all of which, save those in the outermost layer, are covered by one or more overlying layers of ply material (Fig. 11). The wire core of the other bead of the tire (Fig. 12) is embraced by cords the ends of all of which are exposed to the side wall rubber derived from the tread stock or band 52.

Various arrangements of the several ply layers assembled on the flexible building band B in making the band P can be resorted to. Fig. 13 shows an arrangement in which plies or layers 54, 55 and 56 are progressively offset in the same direction and top ply 57 is offset in a reverse direction such that its edges are disposed intermediate the edges of the plies 55 and 56. A tire assembled from a ply band using the arrangement of Fig. 13 will have, adjacent one bead, the cord ends of a single ply layer exposed to the tread stock rubber, and, adjacent the other bead, the cord ends of three ply layers exposed to the tread stock rubber.

In Fig. 14 is illustrated an arrangement wherein the edges of the outer two ply layers 61 and 62 are offset with respect to one another but are both disposed intermediate the offset edges of the inner two ply layers 63 and 64. In building a tire from a band employing the arrangement of Fig. 14, the cord ends of but a single ply layer are exposed to the tread stock rubber adjacent one bead, and the cord ends of only two plies are exposed to the tread stock rubber adjacent the other bead.

Fig. 15 shows an arrangement wherein the outer or last two plies, indicated at 65 and 66, have their edges offset with respect to one another and disposed intermediate the edges of the inner or first two ply layers, indicated at 67 and 68. This arrangement is similar to that of Fig. 14, differing in that the outer three layers, 68, 65 and 66 are all offset in the same direction. A tire assembled from a band built in accordance with the arrangement of Fig. 15 will have the cord ends of one ply exposed to the tread stock rubber adjacent one bead and the cord ends of two plies exposed to the tread stock rubber adjacent the other bead.

Figs. 16 and 17 illustrate an arrangement in which a pair of relatively narrow plies 71 and 72 are incorporated in the ply band, preferably on the inside thereof. These narrow ply layers may be disposed with their edges coinciding with one another, although preferably the side marginal edges are offset, as shown. Ply bands 73, 74, 75 and 76, which are superimposed about the relatively narrow ply bands 71 and 72, are all of substantially the same width and are suitably offset axially with respect to one another such as in accordance with any of the edge staggering arrangements previously described or the specific staggering arrangement shown, in which the ply layers are offset in alternate directions.

A ply band made in accordance with the diagrammatic ply arrangement of Fig. 16 thus comprises at least six plies including four relatively wide plies of standard width and two plies (or more, if desired) of relatively narrow width, less than standard. A tire made from such a ply band has the relatively narrow plies 71 and 72 disposed on the inside of the casing, the edges of the narrow or reinforcing interior plies terminating at or adjacent the inside corners of the beads as indicated at 78 (Fig. 17). In this manner, by building on the belt B, or other band building apparatus, a ply band P having the desired number and arrangement of relatively narrow or inside reinforcing plies such as indicated at 71 and 72 and the desired number and arrangement of relatively wide or outside plies, it is feasible to assemble tires having different numbers and arrangements of plies on a machine such as the expanding drum D without requiring substantial adjustments or changes in the tire building mechanisms employed.

In accordance with the patent statutes the principles of the present invention may be utilized in various ways, numerous modifications and alterations being contemplated, changes in process steps being resorted to as desired, it being understood that the specific apparatus shown and described and the particular method and sequence of operations set forth are given merely for purposes of explanation and illustration without intending to limit the scope of the claims.

What I claim and desire to secure by Letters Patent of the United States is:

1. In the flat band process of making a pneumatic vehicle tire wherein annular layers of cord ply material are supported on a substantially cylindrically shaped form and inextensible circular bead cores and the supported ply material are adhered together, the improvement which comprises expanding the supporting form substantially to a predetermined diameter while maintaining the substantially cylindrical character of the central portion of the supported band to distend such central portion uniformly and simultaneously about its entire circumferential extent to an increased diameter to provide an internally supported substantially cylindrical tread rubber receiving surface, thereafter adhering together the bead cores and the ply material adjacent the ends of the distended central portion and applying tread rubber to said cylindrical surface of the distended central portion of the ply band while the latter is substantially cylindrical in shape, and completing the tire.

2. In the process of making pneumatic vehicle tires of cord reinforced rubber wherein an annular band of superimposed layers of cord ply material is supported in substantially cylindrical form while circular bead anchorages are assembled therewith, the improvement which comprises expanding an annular circumferentially continuous central portion of the band substantially simultaneously about the entire periphery thereof to provide both a substantially cylindrical surface for receiving a strip of tread rubber and a pair of axially spaced radially extending circular bead locating shoulders about the band, placing bead ring core assemblies against the shoulders of the expanded ply band, wrapping marginal portions of the ply band about the placed bead core assemblies, placing tread rubber about the expanded cylindrically surfaced central portion of the ply band, and thereafter further expanding the central portion of the ply band substantially to tire shape.

3. The method of building pneumatic vehicle tires which comprises forming an annular band of superimposed layers of cord ply material, supporting the band in substantially cylindrical shape, expanding the major portion of the supported band uniformly and substantially simultaneously about its entire circumference to a predetermined diameter substantially uniform across the greater part of the width of said portion in the provision of a substantially cylindrical tread rubber receiving surface, placing together a substantially circular bead core and an expanded part of the supported band, folding part of the unexpanded portion of the band about the applied bead, applying tread rubber to the surface of the expanded band, and completing the tire.

4. The method of building pneumatic vehicle tires which comprises forming an annular band of superimposed layers of cord ply material, supporting the band in substantially cylindrical shape, expanding the central portion of the supported band uniformly and substantially simultaneously about its entire circumference to a predetermined diameter substantially uniform across the greater part of the width of said central portion in the provision of a substantially cylindrical tread rubber receiving surface, placing together annular bead anchorages and expanded parts of the band along opposite margins of the expanded portion, folding other portions of the band about the anchorages, applying tread rubber to the surface of the expanded band, and completing the tire.

5. A tire comprising a plurality of layers of cord material, a pair of inextensible bead assemblies and a protective rubber covering, the marginal portions of the cord material layers being folded about the bead assemblies, all layers of each marginal portion being folded in the same direction, said cord material layers being of substantially the same width and having edges offset with respect to one another, at least one of said edges of each of the marginal portions being exposed to and covered by the rubber of the protective covering adjacent the beads, the exposed edges adjacent one of the beads being greater in number than adjacent the other bead, at least one of the layers having an edge adjacent said other bead overlapped and covered by a marginal portion of another layer.

6. A pneumatic vehicle tire of the type having a hollow casing comprising a plurality of layers of ply material of rubber embedded cords extending transversely of the casing as a reinforcing body between a pair of spaced inextensible bead ring anchorages with the cord ends wrapped about the anchorages and an outer covering of rubber extending across the casing substantially from one bead anchorage to the other and including a relatively thick road engaging tread portion, characterized in that the wrapped layers are all formed of ply material strips of substantially the same width with the cord ends of each layer offset with respect to the cord ends of each adjoining layer, and in that all of the wrapped cord ends terminate on the outside of the casing and are disposed between the outer rubber covering and the reinforcing body.

7. The process of building cord reinforced rubber tires which comprises forming an annular band of cord reinforced rubber sheet material, supporting the band in substantially cylindrical form with a substantially uniform diameter from end to end, expanding a central annular portion only of the supported band to a diameter greater than that of the spaced margins of the band in the provision of a substantially cylindrical tread rubber receiving surface and spaced circumferentially extending bead locating shoulders, the expanded central portion being spaced inwardly from the opposite edges of the band to position said shoulders substantially at the junctures between the expanded central portion and the marginal portions, placing bead rings relatively against the shoulders, wrapping the marginal portions of the ply band outwardly about the placed rings, placing tread rubber stock about the cylindrical surface of the expanded band, further expanding the band and the tread stock placed thereabout, and thereafter curing the band and the tread stock.

8. The method of making a pneumatic vehicle tire of the type having a reinforcing body comprising a plurality of layers of cord material arranged with the cords of adjacent layers disposed in alternate directions and having annular bead anchorages about which the ends of the reinforcing cords are wrapped, which comprises superimposing on a building form and adhering together in a substantially continuous series of operations a plurality of layers of bias cut cord ply material substantially equal to the number of cord layers desired in the tire to form an annular composite band in which the several adhered layers mutually restrain relative shifting of the positions of the cords contained in the ply material layers, supporting the composite band in substantially cylindrical form, distending a central annular portion of the supported band to a substantially cylindrical shape of increased diameter in an operation occurring simultaneously about substantially the entire circumferential extent of such annular portion while marginal portions of the band remain substantially undistended providing a substantially cylindrically surfaced band portion for receiving tread rubber and a pair of axially spaced annular shoulders substantially at the junctures between the distended portion and the marginal portions, placing bead ring anchorages relatively against the shoulders, folding the marginal portions of the band radially outward about the placed bead anchorages, applying tread rubber to said cylindrical surface of the distended band, further distending the central portion of the band while the margins are restrained by the anchorages to form a fully expanded band, and thereafter placing the fully expanded band in a heated mold and curing the band.

9. The method of making a pneumatic vehicle tire of the type having a reinforcing body comprising a plurality of layers of cord material arranged with the cords of adjacent layers disposed in alternate directions and having annular bead anchorages about which the ends of the reinforcing cords are wrapped, which comprises superimposing on a building form and adhering together in a substantially continuous series of operations a plurality of layers of bias cut cord ply material substantially equal to the number of cord layers desired in the tire to form an annular composite band in which the several adhered layers mutually restrain relative shifting of the positions of the cords contained in the ply material layers, supporting the composite band in substantially cylindrical form, distending a central annular portion of the supported band to a substantially cylindrical shape of increased diameter in an operation occurring simultaneously about substantially the entire circumferential extent of such annular portion while marginal portions of the band remain substantially undistended, the operation effecting shifting toward one another of the undistended marginal portions of the band and being substantially uniform along the axial length of said distended portion to provide a central substantially cylindrically surfaced band portion comprising the distended portion of the supported band for receiving a band of rubber tread stock and the operation also providing spaced annular shoulders substantially at the junctures between the distended portion and the marginal portions, placing bead ring anchorages relatively against the shoulders, folding the marginal portions of the band radially outward about the placed bead anchorages, applying tread rubber to said cylindrical surface of the distended band, further distending the central portion of the band while the margins are restrained by the anchorages to form a fully expanded band, and thereafter placing the fully expanded band in a heated mold and curing the band.

10. The tire making method which comprises assembling sheet ply material of rubber embedded cord into a multi-layer annular band in which the edges of adjacent layers of substantially equal width are staggered and the individual cords are diagonally disposed, supporting the band in substantially cylindrical form of substantially uniform diameter substantially from end to end, expanding the central portion only of the band uniformly about the entire circumferential extent thereof to provide a central substantially cylindrical band portion and integral substantially cylindrical marginal portions on the ends of the central portion, the marginal portions being of substantially equal diameter less than the diameter of the central portion and connected to such central portion by circular bead locating portions, placing inextensible circular beads against the bead locating portions of the band, folding the marginal portions of the band radially outward over the placed beads, applying tread rubber stock to the expanded central cylindrical portion of the band, further expanding the band after the tread stock is applied, fitting an air bag into the further expanded band, and curing the band so expanded in a heated mold.

11. In the process of building pneumatic cord reinforced rubber tires by the flat band process in which rubber coated bias cord material is formed into a substantially cylindrical multiple layer ply band, spaced circumferentially extending shoulders are formed in the band, inextensible circular bead ring assemblies and radially extending shoulder portions of the ply band are adhered together, and marginal portions of the ply band are subsequently wrapped about the bead ring assemblies, the improvement which comprises distending a central portion only of the band while supporting such central band portion substantially in cylindrical form substantially to a predetermined diameter substantially uniform along substantially the entire axial length of said central band portion and greater than that of the bead assemblies, said distending of the central portion of the band being effected prior to the adhering together of the shoulder portions and the bead assemblies in a primary expansion step that occurs simultaneously throughout substantially the entire circumferential extent of the band to provide said radially extending shoulder portions in the ply band in predetermined spaced relation and with substantially cylindrical ply band portions of different diameters extending axially in opposite directions from each shoulder portion, and thereafter further expanding the band and curing the rubber thereof.

12. In the flat band process of making a pneumatic vehicle tire wherein annular layers of cord ply material are supported on a substantially cylindrically shaped form and inextensible circular bead cores and the supported ply material are adhered together, the improvement which comprises expanding the supporting form substantially to a predetermined diameter while maintaining the substantially cylindrical character of the central portion of the supported band and while annular marginal portions of the band extend axially beyond the expanding form to distend such central portion uniformly and simultaneously about its entire circumferential extent to an increased diameter to provide an internally supported substantially cylindrical tread rubber receiving surface and to provide annular bead wrapping marginal portions of less diameter than the expanded central band portion, and adhering together the bead cores and the ply material adjacent the ends of the distended central portion, folding the annular marginal portions of the ply material about the bead cores, applying tread rubber to said cylindrical surface of the distended central portions of the ply band while the latter is substantially cylindrical in shape, and completing the tire.

13. The tire making method which comprises placing a plurality of layers of rubber embedded cord material about one another in staggered relation to form an annular band of superimposed layers having offset edges, supporting the band in substantially cylindrical form, expanding a portion of the band uniformly and substantially simultaneously about the entire circumference of the band while maintaining said portion substantially cylindrical in the provision of a substantially cylindrical surface for receiving tread rubber and shoulders adjacent the ends of said surface for locating bead rings, positioning bead ring cores in embracing relation about unexpanded portions of the band, adhering together the shoulders and the bead ring cores, folding the last mentioned band portions about the cores and adhering the folded portions to the expanded portion, applying tread rubber to the cylindrical surface of the expanded band portion while supporting the latter internally, further expanding the band with the tread rubber applied, and curing the further expanded band and tread rubber.

14. The process of making pneumatic vehicle tires which comprises assembling layers of ply material in an annular band of substantially cylindrical form having a diameter less than the bead diameter of the tire and containing all the ply layers desired in the completed tire, expanding a central portion only of the band simultaneously around the entire circumference thereof to a substantially cylindrical shape having a diameter greater than the bead diameter of the tire to provide radially extending circular shoulders and a substantially cylindrical tread rubber receiving surface between the shoulders, spaced annular marginal portions of the band being maintained substantially at their original diameter, placing together inextensible bead assemblies and said band shoulders, turning the annular marginal portions of the band about the bead assemblies to envelope the latter, applying tread rubber to said cylindrical surface of the expanded band while supporting the latter against substantial radial displacement along substantially the entire axial length of the expanded central portion expanding the central portion of the band substantially to tire shape, and curing the band.

15. The method of making a pneumatic vehicle tire of the type having a reinforcing body comprising a plurality of layers of cord material arranged with the cords of adjacent layers disposed in alternate directions and having annular bead anchorages about which the ends of the reinforcing cords are wrapped, which comprises superimposing on a building form and adhering together in a substantially continuous series of operations a plurality of layers of bias cut cord ply material substantially equal to the number of cord layers desired in the tire to form an annular composite band in which the several adhered layers mutually restrain relative shifting of the positions of the cords contained in the ply material layers, thereafter expanding a central portion of the composite band in an operation performed substantially simultaneously about the entire circumferential extent of the band and simultaneously on all layers thereof to provide an annular circumferentially distended band portion having a substantially cylindrical tread rubber receiving surface and marginal band portions of less diameter than the distended portion, positioning annular bead anchorages embracingly about the marginal band portions, simultaneously folding all layers of the marginal band portions about the placed anchorages while the central portion of the band is distended, applying tread rubber to said cylindrical surface of the expanded band while supporting the latter against substantial radial displacement along substantially the entire axial length of the expanded central portion and completing the tire.

16. The method of making a pneumatic vehicle tire on a cylindrical forming drum comprising the steps of wrapping a layer of cord material about said drum, the material having end portions extending axially beyond the opposite ends of the drum, securing the wrapped material into substantially cylindrical band form, expanding the forming drum and a central overlying portion of the cord material band which is in contact therewith radially outward to form locating shoulders in the cylindrically shaped band adjacent said drum ends, placing together said locating shoulders of the band and a pair of conventional tire bead ring assemblies to support the ring assemblies on the shoulders in spaced generally parallel relation, turning said extending end portions of the cord material radially outward to a radius greater than that of said expanded central portion of the cord material, and folding each of said end portions outside inwardly over itself, an adjacent bead ring assembly and said expanded central portion.

CLIFFORD B. ORR.

REFERENCES CITED

The following references are of record in the file of this patent:

UNITED STATES PATENTS

| Number | Name | Date |
| --- | --- | --- |
| 1,474,149 | Hopkinson et al. | Nov. 13, 1923 |
| 1,485,170 | Destribats | Feb. 26, 1924 |
| 1,509,366 | Midgley | Sept. 23, 1924 |
| 1,525,455 | Logan | Feb. 10, 1925 |
| 1,551,040 | Marquette | Aug. 25, 1925 |
| 1,734,023 | Smith | Oct. 29, 1929 |
| 1,787,423 | Humphery | Dec. 30, 1930 |
| 1,862,492 | Mallory | June 7, 1932 |
| 1,921,594 | Thompson | Aug. 8, 1933 |
| 1,963,370 | Mallory | June 19, 1934 |
| 2,007,909 | State | July 9, 1935 |
| 2,058,778 | Dinsmore | Oct. 27, 1936 |
| 2,084,009 | Sohl | June 15, 1937 |
| 2,182,176 | Maranville | Dec. 5, 1939 |
| 2,290,627 | Stevens | July 21, 1942 |
| 2,308,957 | Allen | Jan. 19, 1943 |
| 2,501,372 | Benson | Mar. 21, 1950 |
| 2,501,644 | Kraft et al. | Mar. 21, 1950 |
| 2,514,183 | Chandley | July 4, 1950 |

FOREIGN PATENTS

| Number | Country | Date |
| --- | --- | --- |
| 291,314 | Germany | Apr. 14, 1916 |
| 424,767 | Great Britain | Feb. 26, 1935 |